United States Patent [19]

Walter

[11] 4,147,324

[45] Apr. 3, 1979

[54] SHOTGUN TARGET MOLD FOR ICE TARGETS

[76] Inventor: Dennis P. Walter, Box 284, Paxtonville, Pa. 17861

[21] Appl. No.: 831,738

[22] Filed: Sep. 9, 1977

[51] Int. Cl.[2] .................... F25C 1/22; B29C 1/00

[52] U.S. Cl. .................... 249/170; 249/126; 249/121; 249/122; 249/163; 425/DIG. 57

[58] Field of Search .............. 249/119, 121, 126, 127, 249/160, 163, 165, 168, 170, 129, 130, 131, 132; 425/DIG. 57

[56] References Cited

U.S. PATENT DOCUMENTS

| | | | |
|---|---|---|---|
| 1,476,910 | 12/1923 | Naugle | 249/121 X |
| 2,257,377 | 9/1941 | Haben | 249/126 |
| 2,291,672 | 8/1942 | Youngberg | 249/168 X |
| 2,704,927 | 3/1955 | Carrell | 249/119 X |
| 2,961,850 | 11/1960 | Tupper | 249/126 |
| 3,385,205 | 5/1968 | McCloud | 249/121 X |
| 3,684,235 | 8/1972 | Schupboch | 249/126 X |
| 3,727,875 | 4/1973 | Downing | 249/121 |
| 3,776,504 | 12/1973 | Wiley | 249/121 |
| 3,806,079 | 4/1974 | Beattie | 249/126 |
| 3,998,423 | 12/1976 | Mullins | 249/119 X |

FOREIGN PATENT DOCUMENTS

| | | | |
|---|---|---|---|
| 21613 of | 1896 | United Kingdom | 249/168 |
| 1003033 | 9/1965 | United Kingdom | 249/170 |

*Primary Examiner*—J. Howard Flint, Jr.

*Attorney, Agent, or Firm*—Howard I. Podell

[57] ABSTRACT

A mold for forming shotgun targets out of ice has a plurality of concave depressions in an upper section in the mold and mating frustrum shaped depressions in a lower section of the mold. The mold sections are hinged together along a center line of the mold and the mold sections can be held in a closed position using barbed studs engaging stud holding apertures in the opposite sides of the mold. The molds can be stacked together using female ferrules attached to one external side of the mold and engaging male ferrules to opposite sides of the adjacent mold.

1 Claim, 6 Drawing Figures

SHOTGUN TARGET MOLD FOR ICE TARGETS

I have invented a new and novel shot gun target mold for ice targets. My device permits a user to manufacture a target out of an inexpensive material which has the additional advantage of not polluting the environment after use in as much as the ice used in these targets will melt after being shattered by a shot gun pellet. Furthermore, the mold can be stacked to form a large quantity of targets in a freezing compartment in a refrigerator and the molds can be stored therein until needed for use. The individual target mold has a frustrum shape bottom portion and an upper portion with a central concave depression. Ferrules attached to the edges of the mold can be used to stack the molds one on another and the hinge mold compartment can be closed using barbed studs engaging stud holding apertures in the mating sections of the mold.

My invention can be understood in view of the accompanying figures.

Figure 1:
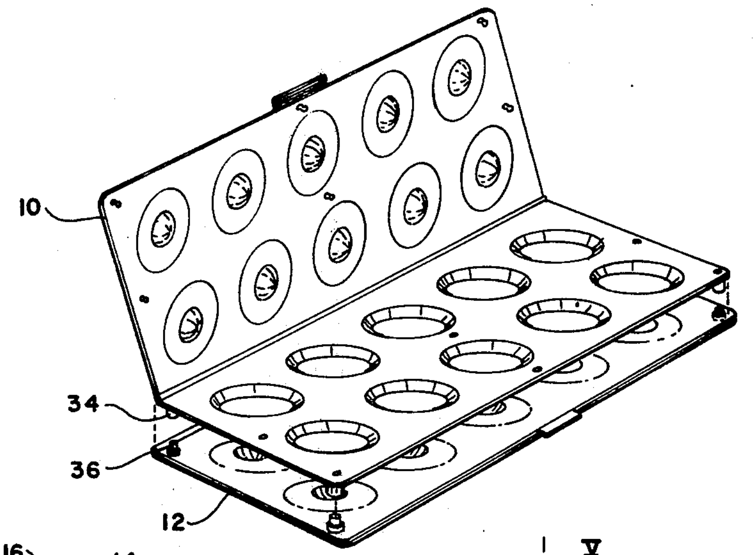
FIG. 1 is a perspective view of one of the molds in an open position about to be stacked on a closed mold.
Figure 2:
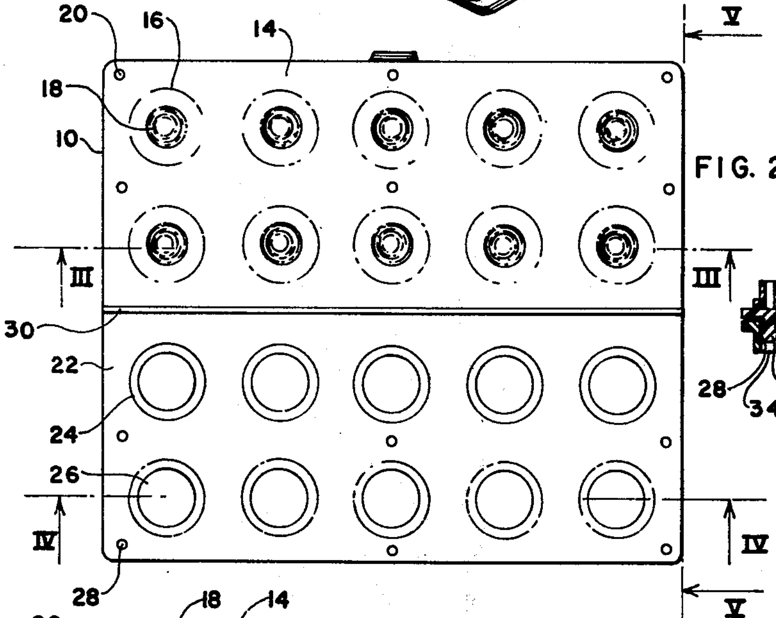
FIG. 2 is a top view of the mold in the fully opened position.
Figure 6:
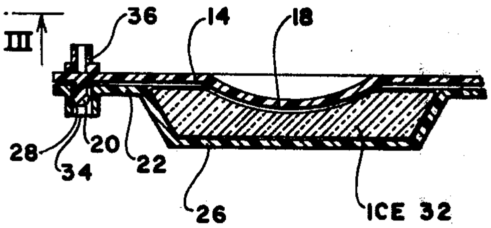
FIG. 6 is a cross sectional side view of the closed mold.
Figure 3:
FIG. 3 is a cross sectional view of the upper portion of the mold taken along the plane 3—3 of FIG. 2.
Figure 4:
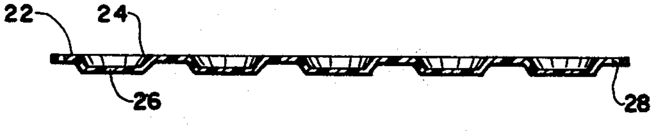
FIG. 4 is a cross sectional side view of the lower section of the mold taken along the plane 4—4 of FIG. 2.
Figure 5:
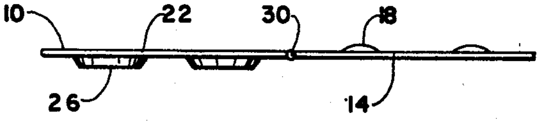
FIG. 5 is a side view of the mold taken along the plane 5—5 of FIG. 2.

With regard to FIGS. 1, 2, 3, 4, 5, and 6, a mold 10 can be stacked on another mold 12 for storage and hardening of the mold material in a refrigerator freezer compartment. The top side 14 of the mold 10 has a plurality of mold areas 16 each of which has a concave depression 18 to form the upper surface of the target and has barbed studs 20 for sealing the mold 10. The bottom section 22 has a mating depression 24 matching the mold area 16 of the upper section 14. The mating depression 24 is of frustrum shape 26. Stud holding apertures 28 in the lower section 22 engage the barbed stud 20 to seal the mold 10. The central hinge 30 is used to pivot the mold sections closed and to hold the mold sections in proper alignment when opened. When in the closed configuration, as seen in FIG. 6, a portion of water frozen to form ice 32 forms the target which can be thrown for contest and practice purposes. A female separating ferrule 34 can be mounted under the stud holding aperture 28 to engage a male separating ferrule 36 which can be positioned on top of the barbed studs 20 in order to separate individual molds such as 10 and 12.

Having described a preferred embodiment of my invention, it is understood that various changes can be made without departing from the spirit of my invention, and, I desire to cover by the appended claims all such modifications as fall within the true spirit and scope of my invention.

What I claim and seek to secure by Letters Patent is:

1. A shotgun target mold, comprising:

a mold for a target, with the mold made of mating sections connected together, wherein a portion of water may be insertable in the mold, and a portion of ice removeable from a mold after a freezing of the postion of water into ice, wherein said mating sections comprise an upper section of the mold and a lower section of the mold, which said upper section and said lower section are hingeably connected together, with a portion of said lower section shaped with a recessed frustrum-shaped mold cavity extending from the interior surface of the said lower section which abuts the interior surface of said upper section when the said mating sections are hinged in the closed position of the mold, and with said upper section shaped with a projecting section extending from the interior surface of the upper section that is located to extend into the said cavity of the lower section in said closed position of the mold, wherein one of the sections of the mold has a barbed stud attached to an interior surface of the section, and the other section of the mold has a stud holding aperture in the mold engageable with the barbed stud, whereby the mold may be held in a closed configuration, and further comprising stackable means for engaging the mold with a second mold, wherein the said stackable means is a female ferrule attached to an outer surface of one of the mold sections, and a male ferrule attached to an outer surface of the other surface of the mold with said female and male ferrules each shaped so as to be engageable with a similar male or female ferrule respectively attached to an adjacent mold of similar shape.

* * * * *